May 21, 1929.  F. I. BARROWS  1,714,472
SECTIONAL AUTOMOBILE BODY
Filed Dec. 26, 1925  2 Sheets-Sheet 1

INVENTOR.
FREDERIC I. BARROWS,
BY
ATTORNEY.

May 21, 1929.  F. I. BARROWS  1,714,472
SECTIONAL AUTOMOBILE BODY
Filed Dec. 26, 1925    2 Sheets-Sheet 2
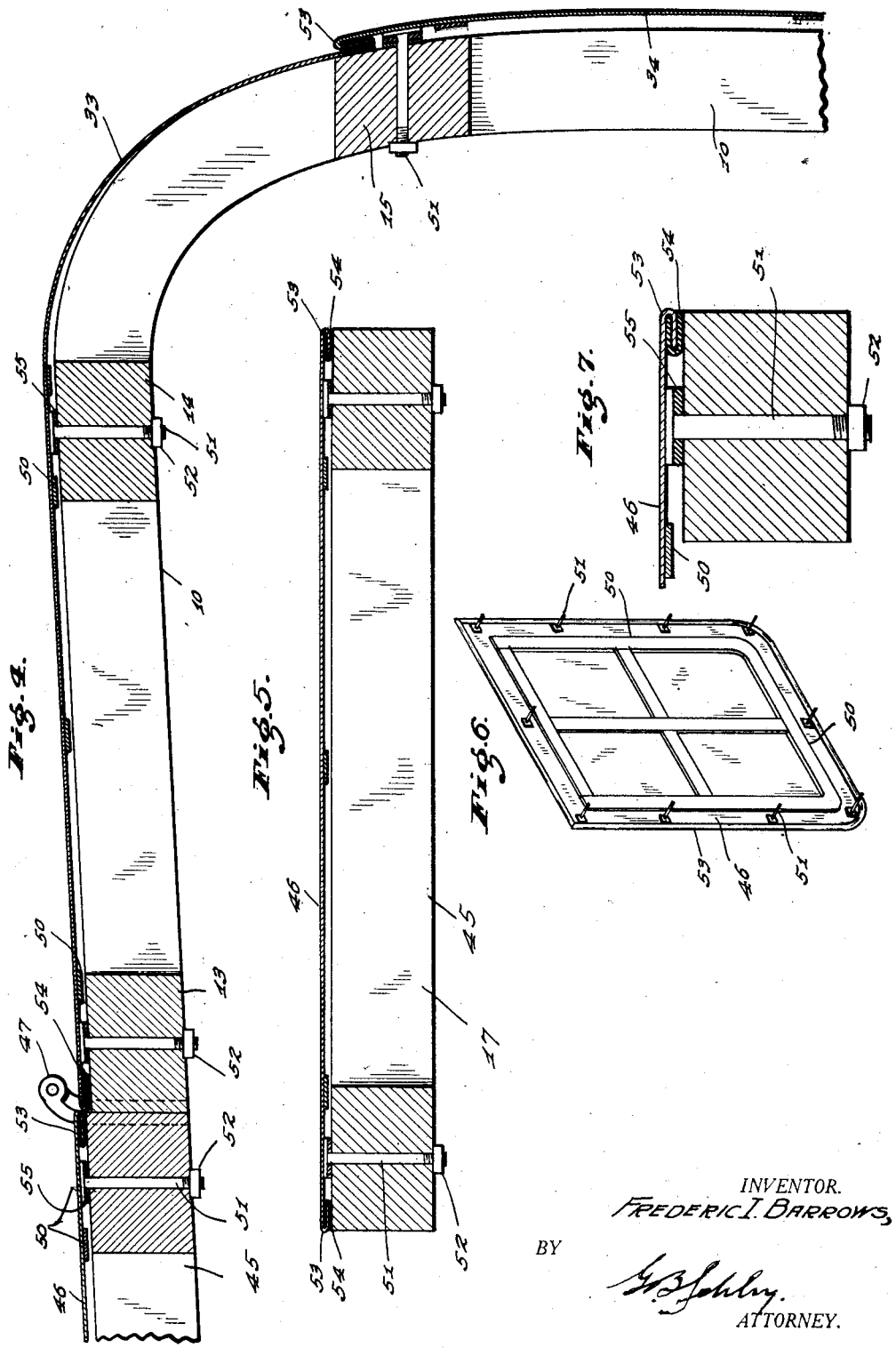
INVENTOR.
FREDERIC I. BARROWS,
BY
ATTORNEY.

Patented May 21, 1929.

1,714,472

UNITED STATES PATENT OFFICE.

FREDERIC I. BARROWS, OF INDIANAPOLIS, INDIANA, ASSIGNOR TO RUTH HULL BARROWS.

SECTIONAL AUTOMOBILE BODY.

Application filed December 26, 1925. Serial No. 77,840.

It is the object of my invention to produce a vehicle body, such as an automobile body, which may be economically manufactured and repaired in case of accident, and the exterior surface of which may be enameled and baked without injury to the upholstery, fittings, or any other parts.

I accomplish the above objects by constructing my automobile with a rigid open frame work and I cover this frame work with a sectional sheet-metal covering, the various sections of which may be separately removed and replaced on the body frame.

Figure 1:
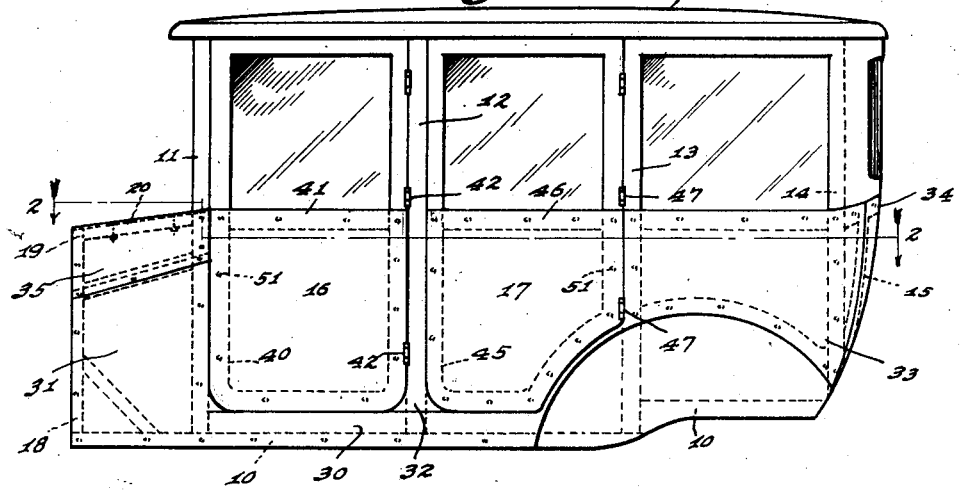
Figure 2:
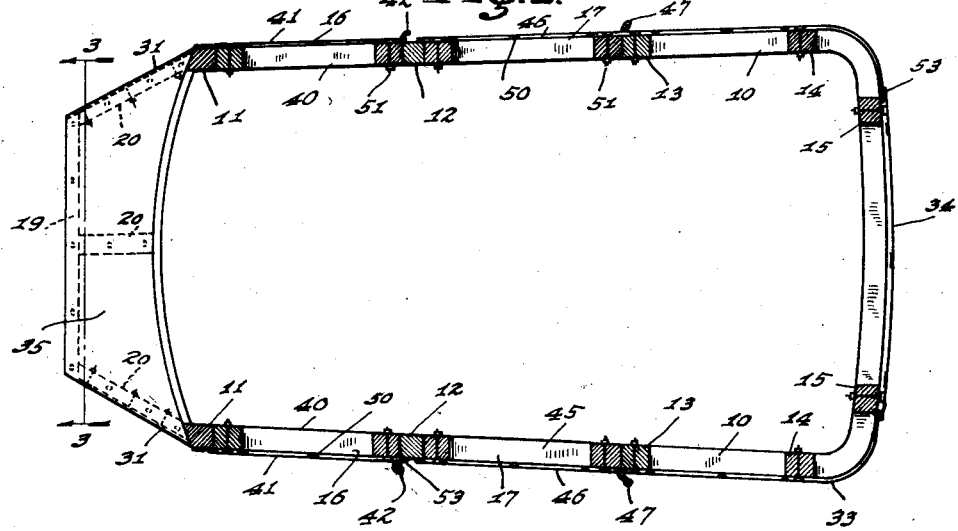
Figure 3:
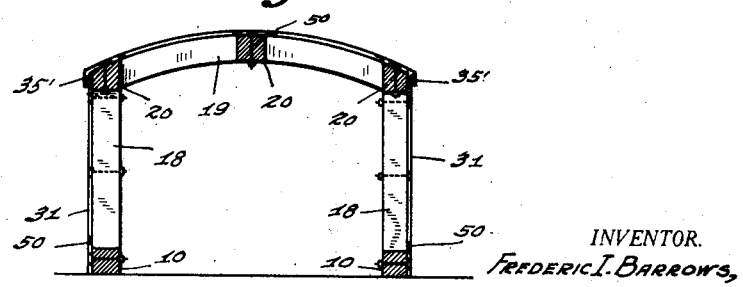

The accompanying drawings illustrate my invention: Fig. 1 is a side elevation of my vehicle body; Fig. 2 is a horizontal section substantially on the line 2—2 of Fig. 1; Fig. 3 is a vertical section through the cowl on the line 3—3 of Fig. 1; Figs. 4 and 5 are fragmental horizontal sections similar to Fig. 2 but on an enlarged scale, Fig. 4 illustrating the construction at a rear corner of the body and Fig. 5 showing the construction of one of the rear doors; Fig. 6 is a perspective view illustrating one of the panels or sections of which the metal covering of my vehicle body is formed; and Fig. 7 is a section on an enlarged scale through a body frame member and one edge of one of the body panels.

I have illustrated my invention as embodied in a conventional four-door sedan body, but it will be evident that my invention may be advantageously employed in connection with any type of vehicle, the form of body shown being merely illustrative. The shapes and disposition of the panels with which the body shown is covered are also merely illustrative, as it will be evident that the shape and arrangement of the panels will vary with the type of body.

In the body shown, suitable body sills 10 support upright members including front door posts 11, center door posts 12, rear door posts 13, rear side posts 14, and back posts 15. Hinged to the center door post and the rear door post 13 respectively are front and rear doors 16 and 17. At the front end of each of the sills 10 there are uprights 18 which support a cross member 19, rearwardly from which extend ribs 20. This type of body frame-work is merely illustrative, as it will be evident that the arrangement of the frame members will vary with the type of body as well as with other considerations.

Above the body proper, the top 25 is supported. In the type of body illustrated, the top is fabric covered, and my invention is therefore not concerned with the details of construction above the body proper.

The frame formed by the sills 10 and the various upright members is covered exteriorly with a sheet metal covering formed of suitably shaped panels. As stated above, the form and arrangement of these panels may vary. As illustrated, a bottom panel 30 extends along each side of the body below the doors. A front side panel 31 extends from the front door 16 to the front of the body on each side. A center panel 32 covers the center door post 12 of each side of the body. A rear side panel 33 is located on each side of the body and extends from the rear door post 13 around the rear side post 14 to the back post 15, and a rear panel 34 extends between the two back posts 15. Across the front of the body extends the cowl 35.

Each of the front doors 16 comprises a frame 40 and a covering panel 41, the door being hinged to the center door post 12 by means of hinges 42. Each rear door 17 consists of a frame 45 and a covering panel 46 attached thereto, the door being supported from the rear door post 13 by hinges 47.

The covering panels above referred to will vary materially in shape, but they have certain features in common. Each panel is provided with reinforcing strips 50 which serve to stiffen the panel and retain it in shape. To each panel are affixed, as by welding, a plurality of bolts 51 adapted to extend through the members forming the body frame. The bolts 51 on any one panel are arranged so that their axes are substantially parallel in order that the panel may be readily put in place on the frame with the bolts passing through the frame members. After the panels are put on the body they are held in place by means of nuts 52. Preferably, any edge of any panel which overlaps another panel is turned under to form a short flange 53, and around this flange 53 there is placed a strip 54 of some compressible material such as felt or rubber composition which will insure a tight and noiseless joint. Desirably, each of the bolts 51 is provided adjacent its head with a washer 55 of compressible material.

In attaching the panels to the frame, the lower panels are put on first. Then the next higher panels are put on with their lower edges overlapping the upper edges of the lower panels in order to insure that water running down the sides of the body will not enter the joints. With the arrangement of panels shown in the drawings, the bottom panel 30 is first attached upon each side of the frame. Following this, the front side panels 31, the center side panels 32, and the rear side panels 33 are bolted in place. Although the rear side panels 33 extend to the back posts 15, these panels are not provided with bolts for attaching them to the back posts, as such bolts could not readily be inserted through the post 15. The side panels 33 are held in place by their associated bolts 51 which pass through the rear door post 13 and the rear side post 14, while the rearwardly and inwardly projecting ends of the panels 33 are held against the back posts 15 by the panel 34, the edges of which overlap the edges of the panels 33, as is clear from Fig. 4. Any time after the front side panels 31 are in place, the cowl 35 may be put in position. The bolts 51 of the cowl 35 pass downward through the ribs 20 and hold the cowl firmly in place. The cowl is provided with downwardly extending flanges 35' which overlie the top edges of the front side panels 31.

A vehicle body constructed as above described is economical to manufacture and particularly economical to repair. In case of an accident, any damaged panel or panels can be removed and replaced and the uninjured part of the body need not be disturbed. Such a body posseses a further advantage in that it can be refinished in enamel. To do this, the various panels are removed, dipped in the enamel and transferred to the baking oven. As there is nothing on the panels which can be injured by heat, no harm results from this process.

I claim as my invention:—

1. A vehicle body, comprising a frame, and a metal covering for said frame, said covering being composed of a plurality of panels, reinforcing members on said panels and bolts affixed to said panels in parallel relation and adapted to extend through members of said frame, each of said panels where it overlaps another panel being provided with an inwardly bent flange extending substantially parallel to said panel for a distance from the edge thereof, and a U-shaped strip of compressible material embracing said flange.

2. A vehicle body, comprising a frame, and a metal covering for said frame, said covering being composed of a plurality of panels, and bolts affixed to said panels in parallel relation and adapted to extend through members of said frame, each of said panels where it overlaps another panel being provided with an inwardly bent flange extending substantially parallel to said panel for a distance from the edge thereof, and a U-shaped strip of compressible material embracing said flange.

In witness whereof, I have hereunto set my hand at Indianapolis, Indiana, this 21st day of December, A. D. one thousand nine hundred and twenty-five.

FREDERIC I. BARROWS.